Aug. 21, 1962  L. D. KLEISS ET AL  3,050,450
EXTRACTIVE DISTILLATION CONTROL
Filed June 12, 1959

INVENTORS
L. D. KLEISS
N. F. MC LEOD
BY
Hudson & Young
ATTORNEYS

United States Patent Office 3,050,450
Patented Aug. 21, 1962

3,050,450
EXTRACTIVE DISTILLATION CONTROL
Louis D. Kleiss and Norman F. McLeod, Borger, Tex., assignors to Phillips Petroleum Company, a corporation of Delaware
Filed June 12, 1959, Ser. No. 819,940
7 Claims. (Cl. 202—160)

This invention relates to control systems for extractive distillation columns.

An extractive distillation process is a fractionation process wherein a solvent is added to the fractionation zone to facilitate the separation of the constituents of the feed mixture. Extractive distillation is employed, for example, in the separation of butadiene from butenes in the presence of other light hydrocarbons. In such a sepration, the solvent employed can advantageously be a solution of furfural, water and heavy oil. This solvent, which is introduced into the upper region of the fractionation column, dissolves butadiene in preference to the butenes and is removed from the bottom of the column with the butadiene kettle product stream.

In the operation of an extractive distillation column, it is desirable that the reflux stream and the solvent stream be maintained at predetermined temperatures. If either of these streams should be cooled excessively, vapor is condensed within the column at the point of introduction of the stream. This results in an increased overhead product purity at the expense of a decreasd overhead product rate and, therefore, a decrease in both bottom product purity and column throughput.

In accordance with the present invention there is provided a novel control system which is based on a computation of the internal reflux in an extractive distillation column. Internal reflux is defined herein as the liquid introduced into the column plus the vapor which is condensed near the point of introduction due to the subcooling of the introduced liquid. The computation of internal reflux is made from a measurement of the rate of flow of the liquid and a measurement of the temperature differential between the liquid introduced into the column and vapor in the column at this region. In response to this measurement, the flow of external reflux in the extractive distillation column is regulated so as to maintain the computed internal reflux constant at a predetermined value.

Accordingly, it is an object of this invention to provide an improved control system for an extractive distillation column.

Another object is to provide a system for computing the total internal reflux in an extractive distillation column.

Other objects, advantages and features of the invention should become apparent from the following detailed description which is taken in conjunction with the accompanying drawing in which.

Figure 1:
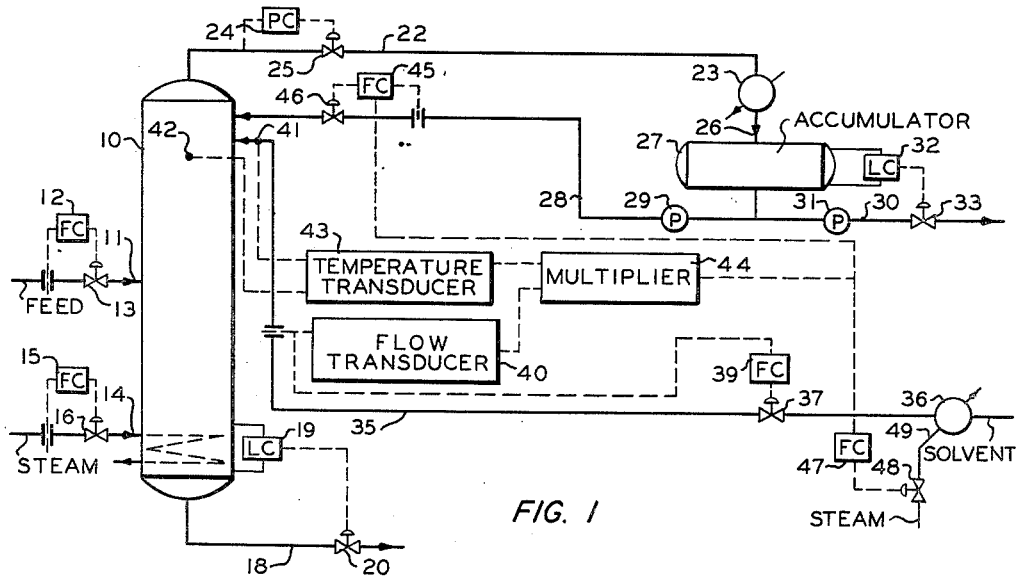
FIGURE 1 is a schematic representation of a first embodiment of the control system of this invention.

Referring now to the drawing in detail and to FIGURE 1 in particular, there is shown an extractive distillation column 10 which is provided with a number of vapor-liquid contacting trays. A fluid mixture to be separated is introduced into column 10 through a conduit 11 at a predetermined rate which is maintained by a flow controller 12 that adjusts a valve 13. Steam, or other heating medium, is circulated through the lower region of column 10 by means of a conduit 14. The flow of steam through conduit 14 is maintained at a predetermined rate by a flow controller 15 which adjusts a valve 16. A kettle product stream is withdrawn from the bottom of column 10 through a conduit 18. The rate of product withdrawal through conduit 18 is regulated by a liquid level controller 19 which adjusts a valve 20 to tend to maintain a constant liquid level in the bottom of column 10.

Vapors are withdrawn from the top of column 10 through a conduit 22 which communicates with the inlet of a condenser 23. The flow through conduit 22 is regulated by a pressure controller 24 which adjusts a valve 25 so as to maintain a predetermined pressure on the top of column 10. The outlet of condenser 23 communicates through a conduit 26 with an accumulator 27. A portion of the resulting condensate in accumulator 27 is returned to the top of column 10 as reflux through a conduit 28 which has a pump 29 therein. The remainder of the liquid in accumulator 27 is removed as overhead product through a conduit 30 which has a pump 31 therein. The flow through conduit 30 is regulated by a liquid level controller 32 which adjusts a valve 33 to tend to maintain a predetermined liquid level in accumulator 27.

A solvent is introduced into the upper region of column 10 by means of a conduit 35 which has a heater 36 and a control valve 37 therein.

In order to explain the operation of the control system of this invention, equations representative of the internal hydrocarbon reflux in an extractive distillation column will be derived. The first of these equations relates to the internal reflux that results from subcooling of the external hydrocarbon reflux.

The material balance at the top tray of the fractionator can be expressed:

$$R_e + V_i = R_i + V_o \tag{1}$$

where $R_e$ = mass flow of liquid entering top tray (external reflux)
$V_i$ = mass flow of vapor entering top tray
$R_i$ = mass flow of liquid leaving top tray (internal reflux)
$V_o$ = mass flow of vapor leaving top tray The heat balance at the top tray can be expressed:

$$R_e h_e + V_i H = R_i h_i + V_o H \tag{2}$$

where $h_e$ = enthalpy of external hydrocarbon reflux
$h_i$ = enthalpy of internal hydrocarbon reflux
$H$ = enthalpy of vapor stream (assumed to be equal)

The enthalpy of the vapor streams entering and leaving the top tray can be expressed:

$$H = h_i + \lambda \tag{3}$$

where $\lambda$ is the heat of vaporization of liquid on the tray.

The enthalpy of the external reflux can be expressed:

$$h_e = h_i - C_p \Delta T \tag{4}$$

where $C_p$ = specific heat of the external hydrocarbon reflux stream
$\Delta T$ = the difference in temperature between the top tray and external reflux.

Equation 3 can be substituted into Equation 2 to eliminate H and rewritten:

$$V_i(h_i+\lambda) - V_o(h_i+\lambda) = R_i h_i - R_e h_e \tag{5}$$

Equation 4 can be substituted into Equation 5 to eliminate $h_e$ and rewritten:

$$(h_i+\lambda)(V_i-V_o) = h_i(R_i-R_e) + R_e C_p \Delta T \tag{6}$$

From Equation 1 it is known:

$$V_i - V_o = R_i - R_e \tag{7}$$

Equation 7 can be substituted into Equation 6 and rewritten to obtain:

$$R_i = R_e + \frac{R_e C_p \Delta T}{\lambda} = R_e\left(1 + \frac{C_p \Delta T}{\lambda}\right) \quad (8)$$

It is seen that the cold external hydrocarbon reflux causes additional internal hydrocarbon reflux equal to $$\frac{R_e C_p \Delta T}{\lambda}$$

in being heated to the temperature existing at the top of the column.

It should be evident from the foregoing derivation that a similar equation $$R_i' = \frac{R_e' C_p' \Delta T'}{\lambda'} \quad (9)$$

describes the internal hydrocarbon reflux $R_i'$ due to cold solvent, where $R_e'$ = mass flow of liquid solvent
$C_p'$ = specific heat of solvent
$\lambda'$ = heat of vaporization of vapor in equilibrium with the liquid on the tray at the point of solvent entry
$\Delta T'$ = the difference in temperature between the material in the column at the point of solvent entry and the solvent.

The total internal hydrocarbon reflux in the column $R_t$ is expressed by the equation $$R_t = R_i + R_i' \quad (10)$$

As a specific example of this invention, reference is made herein to a separation of butadiene from butenes. Typical compositions of the feed, overhead product and kettle product are set forth in the following table:

TABLE I

*Stream Analyses in Mol Percent*

| Component | Feed | Overhead | Kettle |
|---|---|---|---|
| $C_3$'s | 0.7 | 1.2 | |
| iso-butane | 0.8 | 1.2 | |
| iso-Butylene | 1.2 | 2.2 | |
| Butene-1 | 60.9 | 78.1 | 0.2 |
| Butadiene | 24.9 | 0.1 | 89.1 |
| n-Butane | 7.3 | 11.8 | |
| Butene-2 (trans) | 3.8 | 4.6 | 8.9 |
| Butene-2 (cis) | 0.4 | 0.8 | 1.8 |
| Total | 100.0 | 100.0 | 100.0 |

The solvent employed has the following composition:

TABLE II

*Furfural Composition*

| | |
|---|---|
| Water content, wt. percent | 5.1 |
| Oil content, wt. percent | 8.8 |
| Black polymer, wt. percent | 0.04 |
| Furfural, wt. percent | 86.06 |

The operating conditions of the column are set forth in the following table:

TABLE III

*Column Operating Conditions*

Flow rates, gallons/hour:
    Hydrocarbon feed _____ 12,000.
    Furfural feed _____ 95,000.
    Overhead product _____ 9,000.
    Reflux _____ 10,000.
Feed trays:
    Hydrocarbon _____ No. 41.
    Furfural _____ No. 97.
    Total trays in column _____ 100.

Temperatures, °F.:
    Kettle _____ 292.
    Top _____ 75.
    Furfural feed _____ 101.
    Hydrocarbon feed _____ Vaporized.
Pressures, p.s.i.g.:
    Column top _____ 50.
    Accumulator _____ 40.
Column diameter _____ 10'-0" inside diameter.

In order to obtain smooth operation of such an extractive distillation column, it is important to maintain the internal hydrocarbon reflux and the solvent flows in a constant ratio with respect to one another. These two streams are partially soluble in one another and each modifies the other. Any change in the ratio of the flows of the two streams will tend to upset the equilibrium in the column and result in erratic overhead product composition. The solvent flow can generally be held fairly constant under normal operating conditions by use of a conventional flow controller 39 which adjusts a valve 37. However, the solvent stream temperature is more difficult to control because changing atmospheric temperatures change the degree to which the solvent is cooled before entering the column. From Table III, it can be seen that the solvent feed rate is 9½ times greater than the external reflux rate. In view of the substantially larger volume and the fact that this solvent has a greater density and a higher specific heat than the reflux stream, it can be assumed that any sub-cooling of the external reflux stream will have relatively small effect in comparison with a corresponding sub-cooling of the solvent stream. Accordingly, a computation of the internal reflux due to sub-cooling of the solvent stream alone can often provide sufficiently precise correction for ambient effect. If we neglect the relatively minor effect of sub-cooling of the external reflux stream, then the external reflux rate should be regulated according to the following equation:

$$R_e = R_t - \frac{R_e' C_p' \Delta T'}{\lambda'} \quad (11)$$

The term $R_e'$ of Equation 11 is measured by a flow transducer 40 which establishes an output signal representative of the rate of flow through conduit 35. This flow transducer must be some type of measuring device which provides an output signal that is directly proportional to the flow. If a conventional differential pressure sensing device is employed, it is necessary for the flow transducer to include apparatus which is capable of extracting the square root of the measured pressure differential so that the output signal is directly proportional to flow. However, other types of linear flow measuring devices are well known in the art for providing this signal. The term $\Delta T'$ of Equation 11 is established by comparing the temperature of the solvent with the temperature within column 10 adjacent the point at which the solvent is introduced. This is accomplished by the use of two temperature sensing elements 41 and 42 which are connected in opposition to a temperature transducer 43. Transducer 43 provides an output signal which is representative of the term $(K' \Delta T')$, where $K'$ is representative of $$\frac{C_p'}{\lambda'}$$

By suitable calibration of the span and the zero point of a conventional temperature transducer, such an output signal is provided. These two signals are applied to the input of a multiplier 44 which establishes an output signal representative of the product $R_e' K' \Delta T'$ which is the internal hydrocarbon reflux resulting from sub-cooling of the solvent. The output signal of multiplier 44 adjusts the set point of a flow controller 45 which regulates a valve 46 in reflux conduit 28. If the computed internal reflux should tend to increase, for example, the external reflux flow through conduit 28 is decreased. Conversely, the flow is increased if the computed internal reflux decreases.

The output from multiplier 44, representing the computed internal hydrocarbon reflux due to sub-cooling of the solvent, can also be used in more sophisticated control systems. For example, it is possible to add the output signal from multiplier 44 to a signal representing external reflux flow through conduit 28. Such a signal can be obtained from controller 45. The resulting signal (again neglecting the relatively small effect of sub-cooling the external reflux) represents total internal hydrocarbon reflux, $R_t$. This last signal, when fed to a flow controller, can regulate valve 46 to hold a constant internal hydrocarbon reflux, or it can be ratioed to the solvent flow rate signal from transducer 40 so that total internal hydrocarbon reflux and solvent flow maintain a predetermined relationship to each other.

It is possible that upsets in the column operation may occur which are so severe that control can not be accomplished by adjusting the external reflux alone. If this happens, the output signal of multiplier 44 is applied through a flow controller 47 to open a valve 48 in a conduit 49 which supplies steam to a heater 36. Flow controller 47 is set so that valve 48 remains closed unless the computed internal reflux exceeds a preselected value which would decrease the flow of external reflux to zero. If this occur, valve 48 is opened to supply heat to the solvent so that the computed internal reflux will decrease and the external reflux rate will increase to a more desirable range. Generally, heat is supplied to the solvent before controller 45 closes valve 46 beyond a preselected setting. Otherwise, lack of external reflux rate would decrease the overhead product purity below the value desired by permitting solvent vapors to be carried overhead.

Figure 2:
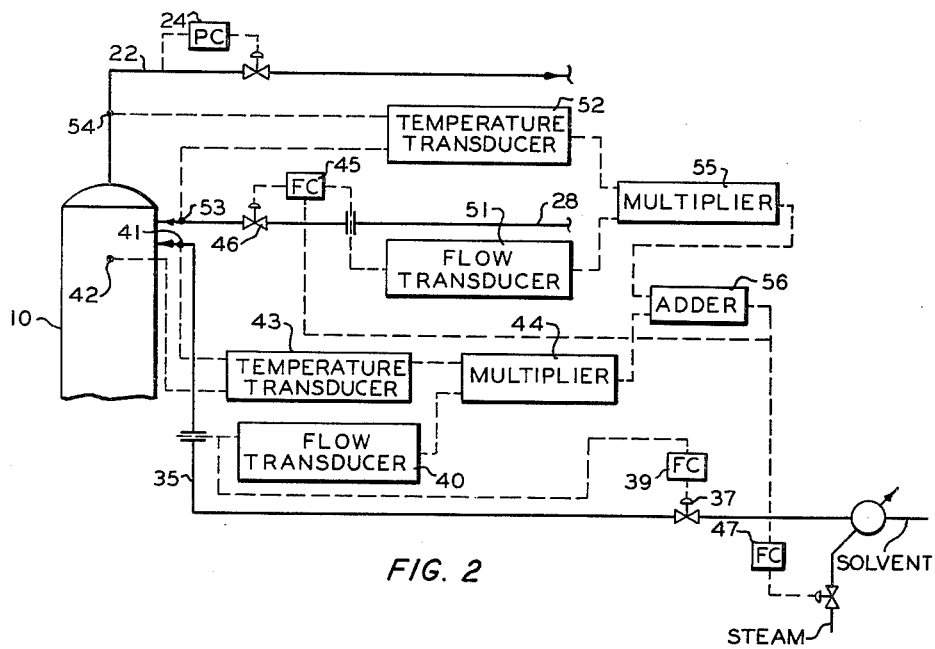
FIGURE 2 is a schematic representation of a second embodiment of the control system of this invention.

The control system thus far described in FIGURE 1 provides effective control for normal operation of many extractive distillation columns. However, in some operations it may be desirable to provide a more accurate control system. This can be accomplished by the apparatus shown in FIGURE 2 which is similar to that shown in FIGURE 1 in many respects and wherein corresponding elements are designated by like reference numerals. The control system of FIGURE 2 computes the internal reflux resulting from both sub-cooling of the solvent and sub-cooling of the external reflux. The term $R_e$ in Equation 8 is established by a flow transducer 51 which establishes a signal representative of the flow through conduit 28. The term $$\left(1+\frac{C_p}{\lambda}\Delta T\right)$$

is established by a temperature transducer 52 which is provided with input signals from sensing elements 53 and 54 in conduits 28 and 22, respectively. The temperature sensed by element 54 is representative of the temperature at the top tray of column 10. The output signals from transducers 51 and 52 are applied to the respective inputs of a multiplier 55. The output signals of multipliers 44 and 55 are applied to the respective inputs of an adder 56, the output of which is representative of the sum $R_t$ of the internal refluxes of Equation 10. This output signal is employed to adjust the set points of flow controllers 45 and 47 as previously described. The control system of FIGURE 2 thus provides a more accurate measurement of the total internal reflux in extractive distillation column 10. This system can be employed to advantage when the temperature of the external reflux is likely to change appreciably in a given time interval. Such temperature changes are likely to occur, for example, when air fan coolers are employed as condenser 23. In any event, either of the control systems of this invention provides an effective procedure for regulating the operation of extractive distillation columns.

As previously mentioned, the computing elements employed in the control system of this invention are well known in the art. Either electrical or pneumatic components can be utilized to advantage. These elements are available commercially at the present time.

While the invention has been described in conjunction with present preferred embodiments, it should be evident that it is not limited thereto.

What is claimed is:

1. In an extractive distillation column wherein a feed mixture to be separated is introduced into the column through first conduit means, a kettle product is withdrawn from the column through second conduit means, vapor is removed from the top of the column through third conduit means and cooled to condense at least a part thereof, a part of the condensed vapor is returned to the column through fourth conduit means as reflux, and a solvent is introduced into the column through fifth conduit means; a control system comprising means to establish a first signal representative of the rate of flow of solvent through said fifth conduit means; means to establish a second signal representative of the quantity ($K\Delta T$), where K is a constant and $\Delta T$ is the temperature difference between solvent introduced into the column through said fifth conduit means and vapor in the column adjacent the point of introduction of solvent; means to multiply said first and second signals to establish a third signal; and means responsive to said third signal to control the flow through said fourth conduit means.

2. The control system of claim 1 further comprising a heater in heat exchange relationship with said fifth conduit means, and means responsive to said third signal to energize said heater when said third signal exceeds a predetermined value.

3. The control system of claim 1 further comprising flow control means in said fifth conduit means to maintain a predetermined rate of flow of solvent therethrough.

4. In an extractive distillation column wherein a feed mixture to be separated is introduced into the column through first conduit means, a kettle product is withdrawn from the column through second conduit means, vapor is removed from the top of the column through third conduit means and cooled to condense at least a part thereof, a part of the condensed vapor is returned to the column through fourth conduit means as reflux, and a solvent is introduced into the column through fifth conduit means; a control system comprising means to establish a first signal representative of the rate of flow of solvent through said fifth conduit means; means to establish a second signal representative of the quantity ($K\Delta T$), where K is a constant and $\Delta T$ is the temperature difference between solvent introduced into the column through said fifth conduit means and vapor in the column adjacent the point of introduction of solvent; means to multiply said first and second signals to establish a third signal; means to establish a fourth signal representative of the rate of flow of reflux through said fourth conduit means; means to establish a fifth signal representative of the quantity ($1+K'\Delta T'$), where $K'$ is a constant and $\Delta T'$ is the temperature difference between the reflux introduced in the column and vapor removed from the column; means to multiply said fourth and fifth signals to establish a sixth signal; means to sum said third and sixth signals to establish a seventh signal; and means responsive to said seventh signal to control the flow through said fourth conduit means to maintain said seventh signal constant.

5. The control system of claim 4 further comprising a heater in heat exchange relationship with said fifth conduit means, and means responsive to said seventh signal to energize said heater when said seventh signal exceeds a predetermined value.

6. The control system of claim 4 further comprising flow control means in said fifth conduit means to maintain a predetermined rate of flow of solvent therethrough.

7. In an extractive distillation column wherein a feed mixture to be separated is introduced into the column through first conduit means, a kettle product is withdrawn from the column through second conduit means, vapor is removed from the top of the column through third conduit means and cooled to condense at least a part thereof, a part of the condensed vapor is returned to the column through fourth conduit means as reflux, and a solvent is introduced into the column through fifth conduit means; a control system comprising means to establish a first signal representative of the rate of flow of solvent through said fifth conduit means; means to establish a second signal representative of the quantity ($K\Delta T$), where K is a constant and $\Delta T$ is the temperature difference between solvent introduced into the column through said fifth conduit means and vapor in the column adjacent the point of introduction of solvent; means to multiply said first and second signals to establish a third signal; means to establish a fourth signal representative of the rate of flow of reflux through said fourth conduit means; means to establish a fifth signal representative of the quantity $(1+K'\Delta T')$, where K' is a constant and $\Delta T'$ is the temperature difference between the reflux introduced in the column and vapor removed from the column; means to multiply said fourth and fifth signals to establish a sixth signal; means to sum said third and sixth signals to establish a seventh signal; mean responsive to said seventh signal to control the flow through said fourth conduit means to maintain said seventh signal constant; flow control means in said fifth conduit means to maintain a predetermined rate of flow of solvent therethrough; a heater in heat exchange relationship with said fifth conduit means; and means responsive to said seventh signal to energize said heater when said seventh signal exceeds a predetermined value.

References Cited in the file of this patent

UNITED STATES PATENTS

| | | |
|---|---|---|
| 1,735,470 | Noel | Nov. 12, 1929 |
| 2,252,550 | Bragg | Aug. 12, 1941 |
| 2,684,326 | Boyd | July 20, 1954 |
| 2,900,312 | Gilmore | Aug. 18, 1959 |
| 2,917,437 | Kleiss et al. | Dec. 15, 1959 |